United States Patent [19]

Waldman

[11] 4,002,805
[45] Jan. 11, 1977

[54] METHOD AND APPARATUS FOR CONTROLLING THE FUEL FLOW TO A STEAM REFORMER IN A FUEL CELL SYSTEM

[75] Inventor: Elliot I. Waldman, West Hartford, Conn.

[73] Assignee: United Technologies Corporation, Hartford, Conn.

[22] Filed: Nov. 20, 1975

[21] Appl. No.: 633,992

[52] U.S. Cl. .................................. 429/17; 429/19
[51] Int. Cl.$^2$ ........................................ H01M 8/06
[58] Field of Search ........... 136/86 B, 86 C; 429/17

[56] References Cited
UNITED STATES PATENTS 3,585,077  6/1971  Waldman .................... 136/86 B

*Primary Examiner*—John H. Mack
*Assistant Examiner*—H. A. Feeley
*Attorney, Agent, or Firm*—Stephen E. Revis

[57] ABSTRACT

A fuel cell system includes an ejector for pumping steam and fuel into a steam reformer. Steam is the primary flow through the ejector and fuel is the secondary flow. The rate of steam flow is metered by a variable area orifice in the ejector. The fuel passes through a fuel control valve before reaching the ejector. A pressure regulator maintains a constant pressure drop across a variable area orifice in the valve. The fuel flow is thus metered by the valve orifice area and not by the ejector pumping characteristics. Ejector back pressure is also eliminated as a factor affecting the amount of fuel pumped by the ejector. Means are provided to simultaneously control the orifice areas of the ejector and the fuel valve in order to maintain a desired ratio of steam to fuel for the steam reformer for each operational mode of the fuel cell. In a preferred embodiment this means is a mechanical linkage connecting the ejector and fuel valve to a common actuator.

8 Claims, 2 Drawing Figures

METHOD AND APPARATUS FOR CONTROLLING THE FUEL FLOW TO A STEAM REFORMER IN A FUEL CELL SYSTEM

CROSS REFERENCE TO RELATED APPLICATION

The subject matter of this application is related to U.S. Pat. No. 3,961,986 entitled "Method and Apparatus for Controlling the Fuel Flow to a Steam Reformer in a Fuel Cell System", Elliot I. Waldman, inventor, filed on even date herewith, and having the same assignee as this application.

BACKGROUND OF THE INVENTION

1. Field of the Invention

This invention relates to a method and apparatus for controlling the fuel flow in fuel cell systems.

2. Description of the Prior Art

A fuel cell is a device which directly converts chemical energy into electrical energy. A fuel, typically hydrogen, and an oxidant, typically air, are supplied to electrodes which are spaced apart by an electrolyte containing member. Electrons flow through an external circuit from one electrode to the other and constitute the electrical output of the cell.

Fuel and air must be supplied to the respective electrodes so that current can be continually supplied to a load in the external circuit. Often the fuel is steam reformed to produce hydrogen in a package outside the fuel cell called a reformer.

Fuel cell control systems have maintained the desired cell output by maintaining the operating temperature of the fuel cell since the cell performance is a function of the temperature. It is also known to monitor reactant pressure, humidity levels, electrolyte concentration, flow rates and a host of other parameters to keep the system operating under optimum conditions.

A more recent method for maintaining the desired cell output is described in U.S. Pat. No. 3,585,078, "Method of Reformer Fuel Flow Control" by R. A. Sederquist and John W. Lane, of common assignee with the present invention. A companion patent, 3,585,077, "Reformer Fuel Flow Control" by E. I. Waldman (applicant for the present invention) of common assignee with the present invention, describes and claims apparatus suitable for use with the method of the aforementioned patent 3,585,078. In those patents feed flow to the reformer is regulated as a function of the fuel cell gross current in combination with biasing the reformer feed flow as a function of reactor temperature. In one aspect of those inventions steam is provided as a primary flow to a variable area ejector wherein a gaseous fuel supply is the secondary flow. Steam flow is regulated depending upon the gross current and reactor temperature. As steam flows into the ejector it creates a low pressure area which draws or aspirates fuel into the ejector; the greater the steam flow, the greater the fuel flow. The fuel mixes with the steam and is conveyed to a catalytic reformer where this feed is steam reformed. The reformed mixture may be fed directly from the steam reformer to the fuel cell or into additional reforming equipment and then to the fuel cell.

A problem with the foregoing system is that the reformer experiences clogging from carbon build-up resulting in a continuously increasing ejector back pressure with time. Of course, the ejector is pumping fuel against this back pressure. The increase in back pressure due to clogging of the reformer prevents the proper fuel flow resulting in reduced efficiency of the system.

In systems where hydrodesulfurizing of the fuel is necessary such as in those systems described in U.S. Pat. No. 3,480,417 to H. J. Setzer, also of common assignee with the present invention, the ejector must also pump recycled hydrogen as well as the fresh fuel flow. The additional pumping required of the ejector, coupled with a further increase in ejector back pressure due to the additional components in the system, make it very difficult if not impossible to provide the required fuel flow even with no clogging of the steam reformer.

SUMMARY OF THE INVENTION

It is an object of the present invention to improve the control of fuel feed to a fuel cell.

A further object of the present invention is to provide, in a fuel cell system wherein an ejector is used to pump fuel into reforming equipment, a method and apparatus for controlling the fuel feed to a fuel cell so that it is independent of ejector back pressure.

According to the present invention, in a fuel cell system a variable area ejector is provided with a primary flow of steam for pumping a secondary flow of gaseous fuel to a steam reformer; the metering orifice area of a variable area fuel flow valve has a constant pressure drop thereacross and is varied in response to ejector metering orifice area changes to change the fuel flow as a function of the rate of steam flow through the ejector. The constant pressure drop across the fuel flow valve eliminates ejector back pressure as a factor affecting the amount of fuel pumped by the ejector. The ratio of fuel to steam for each steam flow rate is established by the fuel valve design in conjunction with the manner in which the valve is coupled to the ejector.

In one particular embodiment of the present invention an actuator moves a pintle into and out of the ejector primary flow metering orifice to vary the area thereof, thereby controlling the rate of steam flow therethrough. The fuel flow valve metering orifice area is also varied by the position of a pintle disposed therein. A pressure regulator senses fuel pressure immediately upstream and downstream of the fuel flow valve metering orifice and maintains a constant pressure drop thereacross. The ejector pintle and the fuel valve pintle are mechanically coupled through an appropriate linkage designed to move the pintles in unison in a manner which establishes the desired ratio of fuel flow to steam flow for every ejector pintle position. Since the fuel flow is now metered only by the fuel flow valve orifice area, the ejector is merely a suction creating device. The ejector meters only steam flow (a function of its pintle position) and provides pumping action for the fuel, but it does not meter the fuel flow.

The suction created by the ejector is always more than strong enough to draw, into the ejector, all the fuel which the fuel flow valve will permit. At ejector back pressure levels which are likely to occur, the steam flow is always critical or nearly critical so that ejector back pressure has little or no effect on the rate of steam flow. Thus, increased back pressure in the reformer is unlikely to have any effect on the steam flow. The fuel flow, too, is not affected by ejector back pressure. Also, since the ejector does not meter the fuel flow, it is unnecessary to trim the fuel flow to match the ejector pumping characteristics, such as is required in the aforementioned related application, Ser. No. (Docket No. C-139) filed on even date herewith. This is particularly important in systems wherein the range or variation in fuel flow requirements may be so great during power plant operation that either proper trimming is not possible, or only very complicated and expensive trimming devices could do the job.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
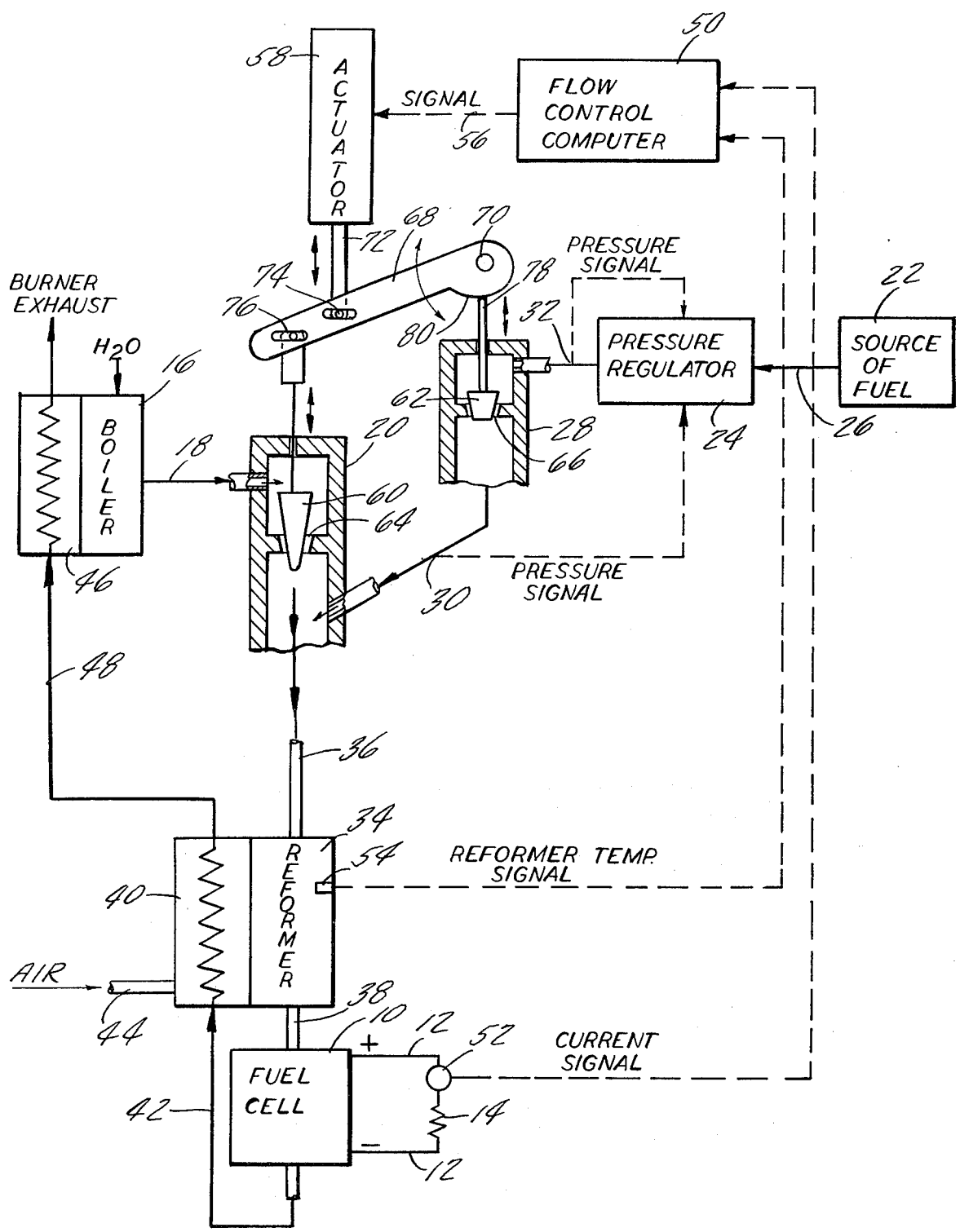
FIG. 1 is a schematic diagram of a fuel cell system according to the present invention.

Referring to FIG. 1, a fuel cell system, utilizing a natural gas fuel, is shown embodying the features of the present invention. A fuel cell 10 has output leads 12 through which electrons generated in the fuel cell are made available to an external load 14. A water supply is converted to steam in a boiler 16 and ducted via a conduit 18 to a variable area ejector 20 wherein the steam is the ejector primary flow. Natural gas fuel from a suitable source 22 is conveyed into a pressure regulator 24 via a conduit 26. The fuel passes from the pressure regulator 24 through a fuel flow control valve 28.

According to the embodiment of the present invention shown in FIG. 1, the pressure regulator 24 receives a pressure signal from a point 30 immediately downstream of the valve 28 and a pressure signal from a point 32 immediately upstream of the valve 28. The pressure at 32 is the output pressure of the pressure regulator 24. The pressure regulator 24 is designed to maintain a constant pressure drop across the valve 28. That is, as the pressure at 30 changes, the pressure at 32 is either increased or decreased by the pressure regulator 24 in order that the pressure drop across the valve does not change.

One type of pressure regulator suitable for use in the present system is the double diaphragm balanced valve regulators made by Maxitrol Company, Southfield, Michigan, having Model Nos. R400S, R500S, and R600S, these models being of similar design but of varying capacity. The fluid pressures at 30 and 32 act directly on these regulators which are designed to automatically increase or decrease the pressure at 32 by an amount equal to the change in the pressure at 30.

After passing through the valve 28 the fuel (the ejector secondary flow) is mixed with steam in the ejector 20 and the fuel/steam mixture is ducted to the reformer 34 via a conduit 36. In the reformer the natural gas fuel is steam reformed to its individual constituents of hydrogen, carbon dioxide, carbon monoxide, and certain residual water and methane. The steam-reformed fuel is ducted to the fuel electrode chamber of the fuel cell 10 via a conduit 38.

Generally, more fuel is circulated through the cell than will be utilized, and the excess of the circulated fuel is discharged from the cell and ducted to a burner 40 via a conduit 42 where it is mixed with air supplied through a conduit 44. This mixture is combusted in the burner 40 for the purpose of supplying heat for the reforming reaction. The burner exhaust gases are ducted to a heat exchanger 46 via a conduit 48 for the purpose of utilizing the waste heat to provide the heat needed to boil the water in the boiler 16.

In operation, the fuel cell is a demand system and the reformer must replenish the fuel supply at the fuel electrode. Fuel is supplied to the fuel cell and the excess is ducted to the burner 40. If the supply is below that required by the fuel cell and the reformer, an insufficient amount of fuel effluent will be rejected by the cell and burned in the burner 40, thereby causing the reformer temperature to decrease. On the other hand, if the excess fuel is too great the reformer temperature increases.

A flow control computer 50 is provided which responds to a current signal from a sensor 52. In addition, the computer is shown as responding to a reformer temperature as signaled to the computer from a pickup 54. The computer 50 incorporates the signals from the current sensor and the temperature pickup and transmits a signal 56 to a device for controlling the reformer feed flow into the ejector 20. The computer 50 thus biases the reformer feed flow depending upon reformer temperature. The reformer feed flow, being a mixture of steam and natural gas, is scheduled to increase with gross current according to a schedule like that represented by FIG. 2 in the aforementioned Sederquist et al patent, incorporated herein by reference.

In this embodiment the signal from the computer 50 is sent to an actuator 58 which controls the movement of a pintle 60 in the ejector and a pintle 62 in the fuel valve. The movement of the ejector pintle 60 controls the area of the ejector metering orifice 64 thereby controlling the flow of steam through the ejector. The ejector is designed so the steam flow across the orifice 64 is always critical or nearly critical, so that variations in ejector back pressure have little or no effect on the steam flow. The movement of the fuel valve pintle 62 controls the area of the fuel metering orifice 66; and, due to the constant pressure drop thereacross, this controls the rate of fuel flow to the ejector.

In this embodiment the fuel valve 28 is coupled to the ejector 20 by means of a link 68. The link 68 is rotated about its pivot 70 by movement of the actuator connecting rod 72 which is pinned to the link 68 in a slot 74. The ejector pintle 60 is also pinned to the link 68 in a slot 76. The rod end 78 of the fuel valve pintle 62 rides on a cam surface 80 of the link 68 and is biased against the surface 80 by a spring which is not shown. The position of link 68 therefore controls the position of both the ejector pintle 60 and the fuel valve pintle 62. With this arrangement the pintles 60 and 62 are moved in unison by the actuator 58. If best system performance is obtained, for example, with a constant steam to fuel ratio throughout all fuel cell operating modes (i.e., for all positions of the ejector pintle 60), this may be readily accomplished by proper design of the cam surface 80.

Figure 2:
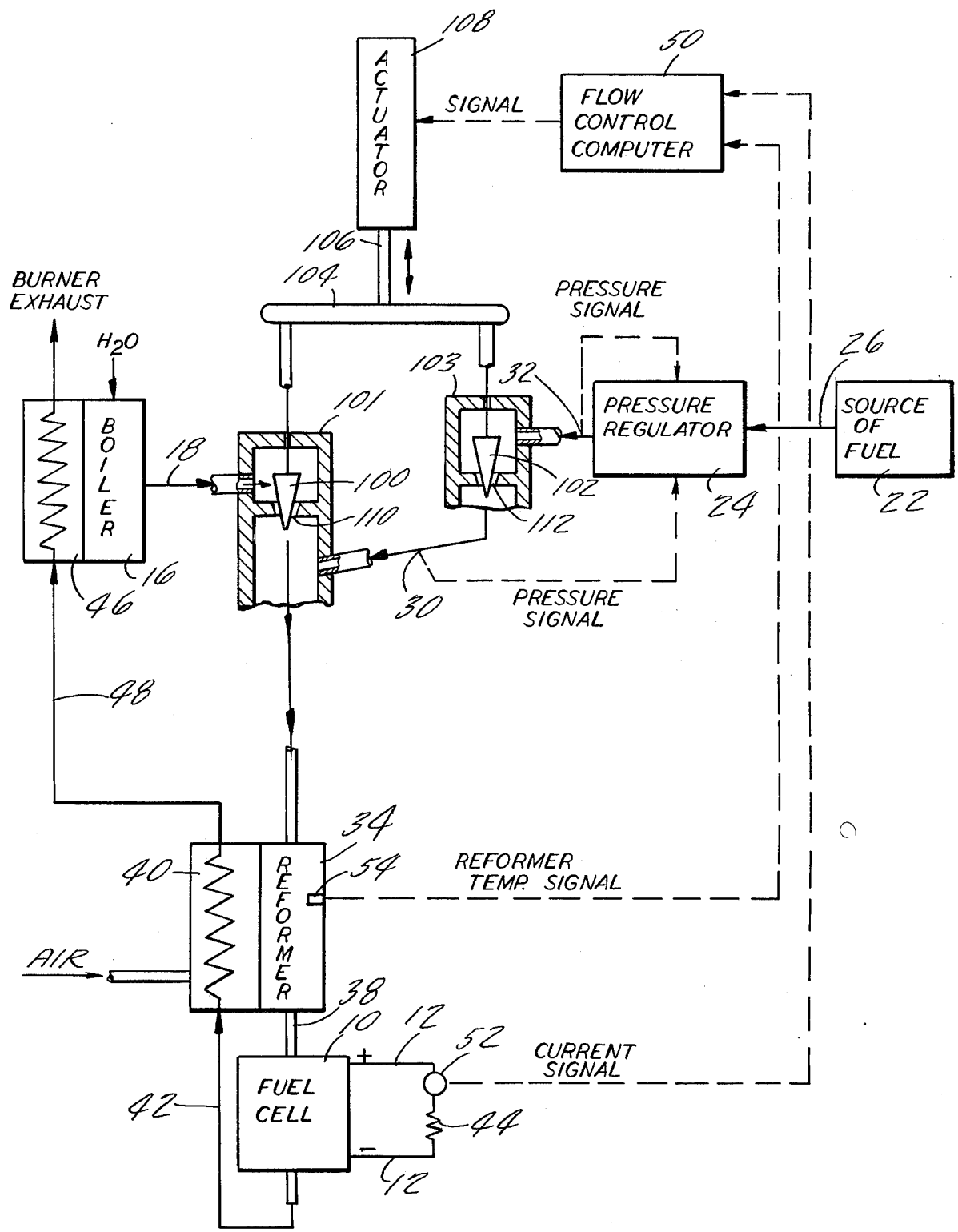
FIG. 2 is a schematic diagram of another embodiment of a fuel cell system according to the present invention.

An alternate embodiment of the present invention is shown in FIG. 2 wherein similar elements have been given the same reference numerals as used in FIG. 1. In this embodiment the pintle 100 of the ejector 101 and the pintle 102 of the fuel valve 103 are rigidly connected by an arm 104 which in turn is rigidly connected to the connecting rod 106 of the actuator 108. With this arrangement the pintles 100 and 102 move equal distances into their respective orifices 110 and 112 upon movement of the connecting rod 106. The fuel valve pintle 102 is shaped to provide the proper area of the orifice 112 for every position of the ejector pintle 100, thereby establishing the proper ratio of fuel to steam for each fuel cell operating mode. Tailoring the shape of the pintle 102 eliminates the more complicated linkage and cam configuration of the embodiment of FIG. 1.

With a constant pressure drop across the fuel valve the rate of fuel flow is basically a function of the valve orifice area 112. Likewise, the rate of steam flow is basically only a function of the ejector primary flow orifice area 110 in conjunction with the pressure of the steam fed to the ejector (which is fairly constant). It is contemplated that any method or apparatus for simultaneously controlling the areas of these orifices in order to provide the proper steam and fuel flow rates over the range of system operating conditions are within the scope of the present invention. For example, the ejector pintle may be actuated mechanically upon command from a flow control computer, while the fuel valve orifice area is controlled by suitable electronic signals which are a function of the ejector pintle position.

Additionally, in the embodiments of both FIGS. 1 and 2 the fuel reforming equipment is shown simply as a steam reformer. This is merely by way of example. The present invention is suitable for use with other reforming equipment in combination with a steam reformer, such as shift converters, selective oxidizers, and hydrodesulfurizers. The increase in ejector back pressure created by this additional equipment has no effect on either the steam flow rate or the fuel flow rate. In prior art systems wherein the ejector back pressure does have an effect on the fuel flow rate, fuel trimming, such as by laminar restrictor is required to match the fuel flow to the ejector pumping characteristics. High back pressures and large variations in the back pressure in prior art systems may make it difficult if not impossible to trim the fuel flow properly. Since, with the present invention, the back pressure no longer has any effect on the fuel flow, this problem is eliminated. Matching steam and fuel flow rates is basically only a function of the ejector and fuel valve orifice areas, and no fuel trimming is necessary.

Although the invention has been shown and described with respect to preferred embodiments thereof, it should be understood by those skilled in the art that other various changes and omissions in the form and detail thereof may be made therein without departing from the spirit and the scope of the invention.

Having thus described typical embodiments of my invention, that which I claim as new and desire to secure by Letters Patent of the United States is:

1. In the method of regulating the feed flow of steam and fuel to reforming apparatus in a fuel cell system including a variable area ejector having a metering orifice as a part thereof, fuel supply means in communication with said ejector for supplying a gaseous fuel to said ejector, said fuel supply means including a fuel flow control valve, said valve having a metering orifice as a part thereof, said fuel reforming apparatus being downstream of said ejector, said apparatus including a steam reformer, and a fuel cell downstream of said apparatus for receiving reformed fuel from said apparatus, the steps of:

introducing steam into the ejector as the primary flow thereof including controlling the rate of steam flow into said ejector by varying the area of said metering orifice of said ejector;

introducing a gaseous fuel into said ejector as the secondary flow thereof for mixing with the steam therein including controlling the rate of fuel flow into the ejector by (1) passing said fuel through said valve, (2) maintaining a constant pressure drop across said valve, and (3) varying, in response to the fuel requirements of said fuel cell, the area of said metering orifice of said valve simultaneously with the step of varying the area of said metering orifice of said ejector and in a manner which provides the desired ratio of fuel to steam for all steam flow rates; and conveying the mixture of fuel and steam from said ejector into the fuel reforming apparatus.

2. The method according to claim 1 wherein said ejector includes a pintle disposed within said ejector metering orifice and said valve includes a pintle disposed within said valve metering orifice, and wherein said steps of controlling the rate of steam flow and controlling the rate of fuel flow include moving said pintles into and out of their respective metering orifices in unison and in a manner which maintains a substantially constant steam-to-fuel ratio for all ejector pintle positions.

3. A fuel cell system comprising:
a variable area ejector having a metering orifice associated therewith;
steam supply means in communication with said ejector for supplying steam as the primary flow thereto;
fuel supply means in communication with said ejector for supplying a gaseous fuel to said ejector as the secondary flow thereto, said fuel supply means including a fuel flow control valve having a metering orifice associated therewith and pressure regulating means, said pressure regulating means including means for maintaining a constant pressure drop across said valve;
fuel reforming apparatus downstream of said ejector for receiving feed flow from the ejector;
a fuel cell disposed downstream of said fuel reforming apparatus for receiving reformed fuel from said apparatus; and
means in communication with said ejector and said valve and responsive to the fuel requirements of said fuel cell for simultaneously varying the area of said metering orifice of said ejector and the area of said metering orifice of said fuel flow control valve such that the desired ratio of steam flow into the ejector to fuel flow into the ejector is maintained for all steam flow rates.

4. The fuel cell system according to claim 3 wherein said means for simultaneously varying the area of said ejector and said fuel flow control valve includes linkage means providing communication between said ejector and said valve and actuation means for actuating said linkage means, said actuation means being responsive to the fuel requirements of said fuel cell.

5. The fuel cell system according to claim 3 wherein said ejector includes a pintle disposed within said ejector metering orifice, and said valve includes a pintle disposed in said valve metering orifice, said fuel cell system also including linkage means connecting said ejector pintle to said valve pintle and actuation means connected to said linkage means for actuating the same, said actuation means, linkage means, ejector and valve being constructed and arranged to move said pintles simultaneously so that the relative size of the area of said ejector metering orifice and said valve metering orifice results in the desired ratio of steam flow rate to fuel flow rate into the ejector for all pintle positions.

6. The fuel cell system according to claim 5 wherein said linkage means includes a link which pivots about a point and which includes a cam surface, said valve pintle including means riding on said cam surface for varying the pintle position according to the position of said cam surface, said ejector pintle including means connected to said link, said pintles thereby changing their position in accordance with the position of said link.

7. The fuel cell system according to claim 5 wherein said ejector pintle and said valve pintle are rigidly connected through said linkage means wherein movement of said linkage means results in identical movement of both pintles, and wherein said ejector pintle shape in relationship to its respective metering orifice and said valve pintle shape in relation to its respective metering orifice are such as to maintain the desired ratio of fuel flow rate to steam flow rate for all pintle positions.

8. The fuel cell system according to claim 5 wherein said desired ratio of steam flow rate to fuel flow rate is constant for all pintle positions.

* * * * *